United States Patent [19]

Yoshizawa et al.

[11] Patent Number: 4,527,365
[45] Date of Patent: Jul. 9, 1985

[54] EARTHQUAKE INSULATING BEARING ASSEMBLY

[75] Inventors: Toshikazu Yoshizawa, Kodaira; Takafumi Fujita, Chiba, both of Japan

[73] Assignee: Bridgestone Tire Co., Ltd., Chiba, Japan

[21] Appl. No.: 416,373

[22] Filed: Sep. 9, 1982

[30] Foreign Application Priority Data

Sep. 10, 1981 [JP] Japan ................................ 56-142864

[51] Int. Cl.$^3$ ............................. E04H 9/02; E04B 1/98
[52] U.S. Cl. ............................................... 52/67; 267/154
[58] Field of Search ................ 52/167; 248/548, 562; 267/154

[56] References Cited

U.S. PATENT DOCUMENTS 4,179,104 12/1979 Skinner et al. ................. 52/167 X

FOREIGN PATENT DOCUMENTS 2609394 9/1977 Fed. Rep. of Germany ........ 52/167
3047762 7/1982 Fed. Rep. of Germany ........ 52/167
2254974 7/1975 France ................................. 52/167
696115 11/1979 U.S.S.R. ............................. 52/167

Primary Examiner—J. Karl Bell
Attorney, Agent, or Firm—Cushman, Darby & Cushman

[57] ABSTRACT

An earthquake-insulating bearing assembly is mounted between a foundation and a building structure. A first friction member is fixedly secured to a lower surface of the building structure. An elastic bearing is interposed between and fixed relative to an upper surface of the foundation and the lower surface of the building structure. A guide means is vertically mounted on the upper surface of the foundation. A second friction member of an annular shape is disposed around the elastic bearing and is engaged with the guide means for vertical movement therealong. An urging means is fixed relative to the upper surface of the foundation for urging the second friction member into frictional engagement with the first friction member under a selected load. The urging means comprises means for adjusting the load applied to the second friction member.

3 Claims, 10 Drawing Figures

EARTHQUAKE INSULATING BEARING ASSEMBLY

BACKGROUND OF THE INVENTION

1. Field of the Invention

This invention relates to an earthquake-insulating bearing assembly for mounting between a foundation and a building structure such as a nuclear reactor building, a bridge and the like so as to efficiently protect it from an earthquake attack.

2. Prior Art

One conventional earthquake-insulating bearing 50 shown in FIG. 1 is of an elastic construction comprising elastic sheets 51 and metal sheets 52 stacked one upon another alternately and connected together. A plurality of bearings 50 are mounted between a foundation 53 and a building structure 54. When an earthquake occurs, the foundation 53 is moved horizontally so that the lower portion of the elastic bearing 50 is also moved horizontally together with the foundation 53. At this time, the elastic bearing 50 is elastically deformed to suitably absorb a horizontal inertia force of the building structure 54 to thereby protect it from an earthquake attack. This elastic bearing may be of a one-piece molded construction comprising a plurality of closely spaced metal sheets 52 molded in rubber or the like, as shown in FIG. 2. Such conventional elastic bearings have been found not satisfactory, however, in that when a severe earthquake occurs, the elastic bearings are elastically deformed to such an extent that the horizontal displacement of the building structure 54 relative to the foundation 53 is excessive to frequently damage a piping installed between the building structure 54 and the ground. In addition, in such a case, the elastic bearings themselves can be subjected to damage.

In order to overcome the above-mentioned difficulty, another earthquake-insulating device 56 shown in FIGS. 3A to 3C has been proposed in the art. An elastic bearing 57 in FIGS. 3A to 3C is identical in construction to the bearing 50 in FIG. 2. A friction plate 58 is fixedly secured to an upper end of the elastic bearing 57, and a friction plate 59 is fixedly secured to a lower surface of the building structure 54. The friction plate 58 is held in frictional contact with the friction plate 59. With this construction, a horizontal inertia force of the building structure 54 is absorbed both by the elastic deformation of the elastic bearing 57 and the friction between the two friction plates 58 and 59 during an earthquake. With this earthquake-insulating device, however, when an earthquake occurs, the friction plate 59 is horizontally displaced or moved relative to the friction plate 58 as shown in FIG. 3B, and after the earthquake is over, the friction plate 59 is retained in its displaced position as shown in FIG. 3C due to the friction between the two friction plates 58 and 59. As a result, the building structure 54 is returned to its initial position (FIG. 3A) using jacks or other lifting devices. This requires much time and labor. In addition, when a severe earthquake occurs, there is a risk that the friction plate 58 is brought out of engagement with the friction plate 59. Further, it is also possible that the elastic bearing 57 is caused to fall down.

FIG. 4A shows a further conventional earthquake-insulating assembly 60. This assembly comprises an elastic bearing 61 of the type described above and a flexural beam 62 fixedly secured at opposite ends thereof to a support member 63 and an engaging member 64 on the building structure 54, respectively. With this arrangement, a horizontal inertia force of the building structure 54 is absorbed both by the elastic deformation of the elastic bearing 61 and the flexural deformation of the beam 62. A hysteresis loop of the flexural beam 62 is shown in FIG. 4B, and the inclination of the curve representative of the relation between the force F on the weight and its displacement is relatively large. Therefore, a horizontal soft stiffness of the elastic bearing 61 is affected by a modulus of elasticity in an initial deformation of the beam 62. As a result, the elastic bearing can not fully achieve its intended function. Further, the hysteresis of the beam 62 is obtained by its flexural deformation, and therefore the beam 62 can not be installed in a space between the foundation 53 and the building structure 54. This necessitates the use of the support member 63 of the beam 62, and therefore the installation of this earthquake-insulating assembly 60 can not be carried out so easily. Further, after an earthquake is over, the beam remains deformed. As a result, the building structure 54 must be brought into its initial position using jacks or the like. Alternatively, it is necessary to remove the deformed beam for replacement with a new one to achieve this.

A further conventional earthquake-insulating assembly 65 shown in FIG. 5 comprises an elastic bearing 66 of the type described above and an oil damper cylinder 67. A connecting member 68 is mounted on a lower surface of the building structure 54. The upper end of the elastic bearing 66 is fixedly secured to the connecting member 68. A piston rod 67a of the oil damper cylinder 67 is connected to the connecting member 68. With this construction, a horizontal inertia force of the building structure 54 is absorbed both by the elastic bearing 66 and the oil damper cylinder 67. The oil damper cylinder 67 has a speed dependency and therefore is not so effective for absorbing vibrations having a relatively long cycle, such as those caused by an earthquake. Further, the oil damper cylinder can absorb displacement of the building structure only in an axial direction of the piston rod 67a, and is not effective for displacement in the other directions.

SUMMARY OF THE INVENTION

It is therefore an object of this invention to provide an earthquake-insulating bearing assembly which can effectively protect a building structure from severe earthquake attacks which cause shaking in every direction.

Another object is to provide such an earthquake-insulating bearing assembly which facilitates the returning of the displaced building structure to its initial position after the earthquake is over.

A further object is to provide such an earthquake-insulating bearing assembly which requires only one foundation.

According to the present invention, there is provided an earthquake-insulating bearing assembly for mounting between a foundation and a building structure, the bearing assembly comprising a first friction member fixedly secured to one of a lower surface of the building structure and an upper surface of the foundation disposed in opposed relation thereto, the first friction member being disposed horizontally; an elastic bearing interposed between and fixed relative to the lower surface of the building structure and the upper surface of the foundation, the elastic bearing comprising rubber sheets and metal sheets stacked one upon another alternatively and connected together; a guide means vertically mounted on the other of the opposed lower and upper surfaces; a second friction member of an annular shape disposed around said elastic bearing, the second friction member being engaged with the guide means and movable vertically therealong; and an urging means fixed relative to the other of the opposed lower and upper surfaces for urging said second friction member into frictional engagement with the first friction member under a selected load, the urging means having means for adjusting the load applied to the second friction member.

DESCRIPTION OF THE PREFERRED EMBODIMENT

Figure 6:
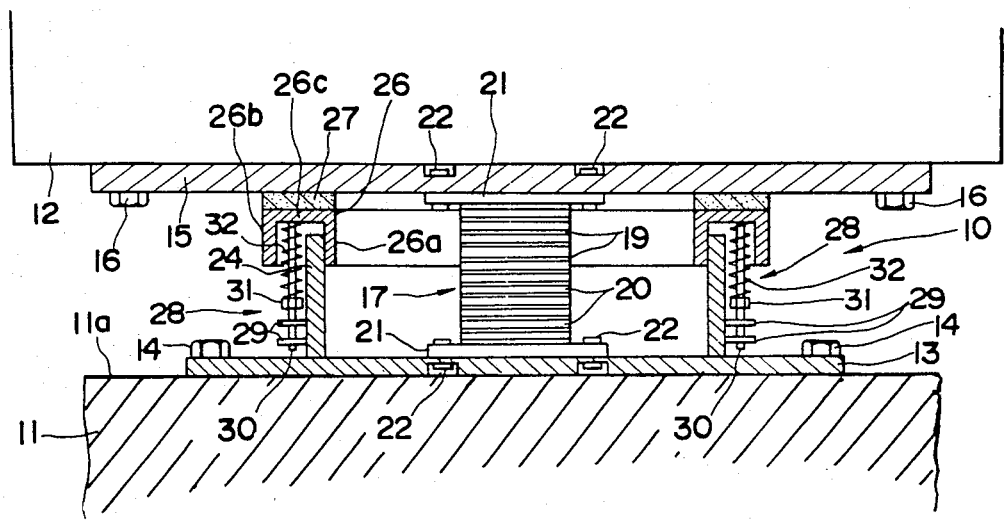
FIG. 6 is a cross-sectional view of an earthquake-insulating bearing assembly provided in accordance with the present invention.

FIG. 6 shows an earthquake-insulating bearing assembly 10 mounted between a foundation 11 and a building structure 12. The bearing assembly 10 comprises a mounting plate 13 fixedly secured by bolts 14 to an upper horizontal surface 11a of the foundation 11, and a friction plate 15 disposed in opposed relation to the mounting plate 13 and fixedly secured by bolts 16 to a lower horizontal surface 12a of the building structure 12. The lower surface of the friction plate 15 serves as a friction surface.

An elastic bearing 17 extends between and are fixedly secured at its opposite ends to the mounting plate 13 and the friction plate 15, respectively. The elastic bearing 17 includes an elongated body and is of a multi-layer structure comprising rubber sheets 19 and metal sheets 20 stacked one upon another alternatively and connected together by suitable means. A pair of end plates 21 and 21 are affixed respectively to the opposite ends of the elastic bearing 17. The pair of end plates 21 and 21 are fixedly secured by bolts 22 respectively to the mounting plate 13 and the friction plate 15 at their centers. With this arrangement, the longitudinal axis of the elastic bearing 17 is disposed vertically.

An annular guide wall 24 is formed integrally with and extends upwardly from the upper surface of the mounting plate 13, the guide wall 24 surrounding the elastic bearing 17 in concentric relation thereto and terminating short of the friction plate 15.

An annular member 26 has an inverted U-shaped cross-section defined by a pair of opposed inner and outer arms 26a and 26b and a base 26c interconnecting the arms 26a and 26b at their one ends. The annular member 26 is mounted on the annular guide wall 24 with the inner arm 26a disposed in sliding contact with the inner peripheral surface of the guide wall 24 so that the annular member 26 is vertically movable along the guide wall 24. An annular friction member 27 is fixedly secured to the upper surface of the base 26c of the annular member 26. A plurality of urging means 28 are mounted around the outer peripheral surface of the annular guide wall 24 in spaced relation. Each of the urging means 28 comprises a pair of supporting lugs 29 and 29 fixedly secured to the peripheral surface of the guide wall 24 by welding, an externally-threaded rod 30 supported by the pair of supporting lugs 29 and 29 in parallel spaced relation to the outer peripheral surface of the annular guide wall 24 and extending into the U-shaped annular member 26, a nut 31 threaded on the threaded rod 30 and disposed above the pair of supporting lugs 29 and 29, and a compression coil spring 32 wound around the threaded rod 30 and acting between the nut 31 and the base 26c of the U-shaped annular member 26. The compression springs 32 urge the annular member 26 and the friction member 27 upwardly so that the friction member 27 is held in frictional contact with the friction plate 15. The urging force applied by each compression springs 32 can be easily adjusted by moving the nut 31 along the threaded rod 30 so that the pressure of contact of the friction member 27 with the friction plate 15 can be controlled. Thus, the nut 31 serves as means for adjusting the compressive force of the spring 32.

The operation of the earthquake-insulating bearing assembly 10 will now be described. When an earthquake occurs, the foundation 11 is moved horizontally so that the lower portion of the elastic bearing 17 is also moved horizontally together with the foundation 11. At this time, the annular member 26 and the friction member 27 supported on the annular wall 24 are also moved horizontally relative to the friction plate 15. Therefore, a horizontal inertia force of the building structure 12 is suitably absorbed by the elastic deformation of the elastic bearing 17 and the friction exerted between the friction member 27 and the friction plate 15 to thereby protect the building structure 12 from damage. The friction member 27 is of an annular shape so that even when the foundation 11 is subjected to shaking in any horizontal directions due to an earthquake, the friction member 27 is always held in positive frictional engagement with the friction plate 15 to thereby fully achieve its intended function. Also, since a plurality of urging means including the compression springs 32 are arranged in circumferentially spaced relation to the elastic bearing 17, the overall spring stiffness of the bearing assembly 10 is increased so that the building structure 12 is protected from falling down when subjected to severe shaking caused by an earthquake. Even when as a result of the occurrence of an earthquake of great magnitude, a substantial force is exerted on the elastic bearing 17 to damage or destroy it, the annular wall 24 can prevent the building structure 12 from falling down. More specifically, in such a case, the annular member 26 of an inverted U-shaped cross-section is moved vertically along the annular wall 24 so that the base 26c of the annular member 26 is brought into contact with the upper end of the annular wall 24. Thus, the annular member 26 is prevented from moving horizontally relative to the annular wall 24.

There are occasions when the building structure 12, which has been horizontally displaced out of its initial position relative to the foundation 11 during an earthquake, is retained in its displaced position due to the frictional force existing between the friction member 27 and the friction plate 15 after the earthquake is over. In such a case, the elastic bearing 17 remains deformed, and it is necessary to bring the building structure 12 into its initial position. To achieve this, the nut 31 of each urging means 28 is loosened or moved downwardly along the threaded rod 30 to reduce the compressive force of the compression spring 32. Therefore, the pressure of contact of the friction member 27 with the friction plate 15 is released so that the building structure 12 is supported only by the elastic bearing 17. As a result, the deformed elastic bearing 17 restores into its initial configuration (FIG. 6) due to its own elastic nature so that the building structure 12 is brought into its initial position. Then, the nut 31 is again tightened or moved upwardly along the threaded rod 30 to compress the compression spring 32 so that the friction member 27 is held in positive frictional engagement with the friction plate 15 under a preselected load.

Figure 1:
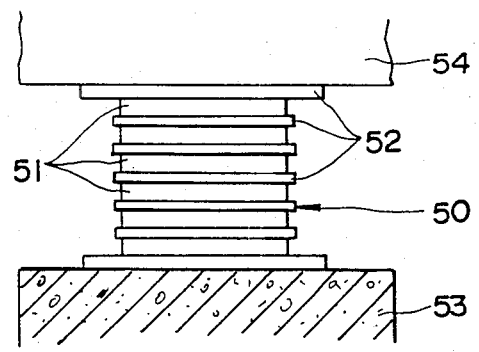
FIG. 1 is a side elevational view of an earthquake-insulating bearing according to the prior art.
Figure 2:
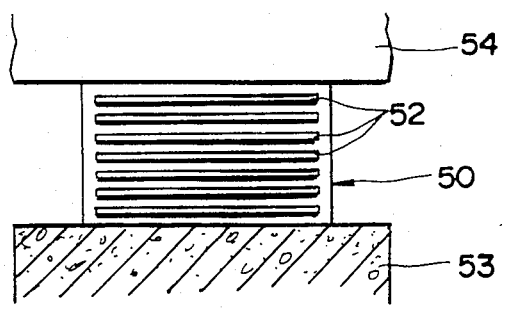
FIG. 2 is a view similar to FIG. 1 but showing another conventional bearing.
Figure 3A:
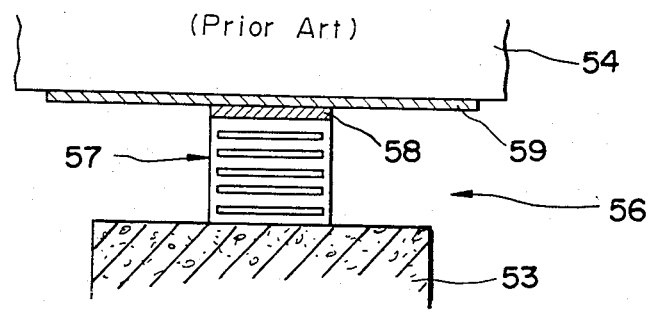
FIGS. 3A to 3C are views similar to FIG. 1 but showing a further conventional bearing.
Figure 3B:
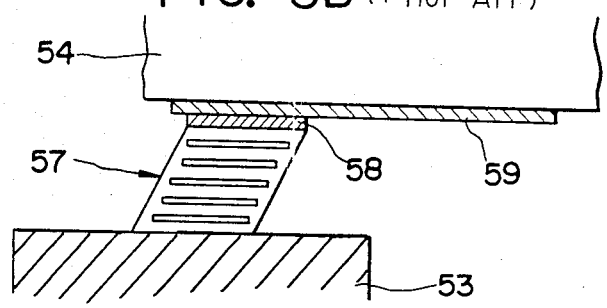
Figure 3C:
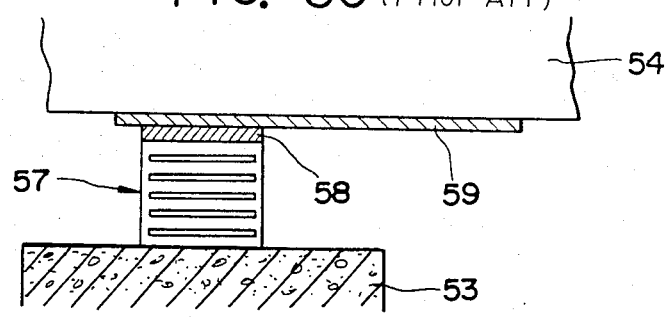
Figure 4A:
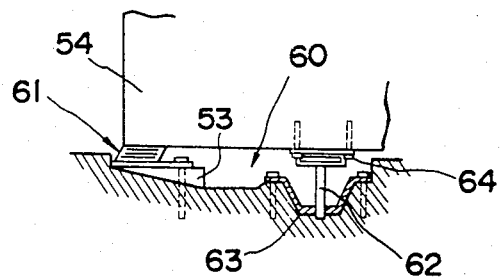
FIG. 4A is a side elevational view of a conventional earthquake-insulating bearing assembly.
Figure 4B:
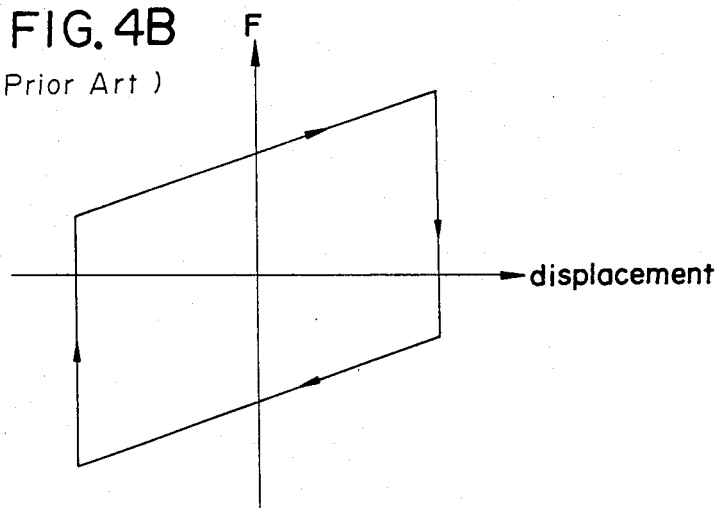
FIG. 4B is an illustration showing a hysteresis loop of a beam used in the bearing assembly of FIG. 4A.
Figure 5:
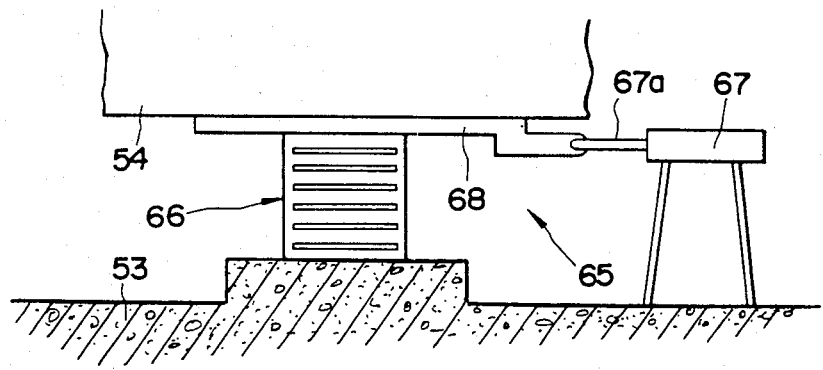
FIG. 5 is a view similar to FIG. 4A but showing another conventional bearing assembly.

The friction member 27 and the urging means 28 are mounted through the annular wall 24 on the mounting plate 13. Therefore, an additional support member does not need to be provided as is the case with the conventional bearing assembly 60 in FIG. 4A, and the earthquake-insulating bearing assembly 10 can be installed easily and quickly. In addition, the bearing assembly 10 is of a compact type and is provided as a unit so that it can be installed easily and quickly and is easy in maintenance.

The frictional force exerted between the friction member 27 and the friction plate 15 should not be too great and should preferably be 5 to 10% of the horizontal inertia force of the building structure 12. The frictional force exerted between the friction member 27 and the friction plate 15 is obtained from the following formula:

$$\mu F = (0.05 \sim 0.1) W$$

wherein $\mu$ is a coefficient of friction between the friction member 27 and the friction plate 15, F is a reaction force of springs 32, and W is the weight of the building structure 12.

Therefore, the reaction force F is represented by the following formula:

$$F = \frac{0.05 \sim 0.1}{\mu} W$$

The spring constant of each compression spring 32 and the degree of compression of the spring 32 which is adjustable by the nut 31 are so preselected as to obtain this reaction force F.

Figure 7:
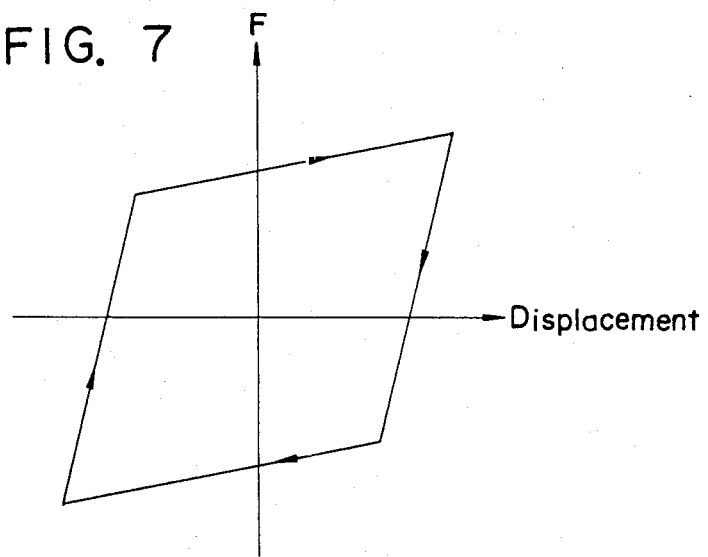
FIG. 7 is an illustration showing a hysteresis loop of springs used in the bearing assembly of FIG. 6.

A hysteresis loop for the springs 32 is shown in FIG. 7, and the inclination of the curve representation of the relation between the force F on the weight and its displacement is kept to a relatively low level. Therefore, a horizontal soft stiffness of the elastic bearing 17 is not adversely affected, as is the case with the conventional bearing assembly 60 in FIG. 4A, so that the elastic bearing 17 can fully achieve its intended function.

While the earthquake-insulating bearing assembly 10 according to the present invention has been specifically shown and described herein, the invention itself is not to be restricted by the exact showing of the drawings or the description thereof. For example, the mounting plate 13 may be mounted on the building structure 12 while the friction plate 15 is mounted on the foundation 11. In this case, the annular wall 24, the urging means 28, the annular member 26 and the friction member 27 are arranged in reverse relation to those shown in FIG. 6.

What is claimed is:

1. An earthquake-insulating bearing assembly for mounting between a foundation and a building structure, said bearing assembly comprising:
   (a) a first friction member fixedly secured to one of a lower surface of the building structure and an upper surface of the foundation disposed in opposed relation thereto, said first friction member being disposed horizontally;
   (b) an elastic bearing interposed between and fixed relative to said lower surface of the building structure and said upper surface of the foundation, said elastic bearing comprising rubber sheets and metal sheets stacked one upon another alternately and connected together;
   (c) a guide means vertically mounted on the other of said opposed lower and upper surfaces;
   (d) a second friction member of an annular shape disposed around said elastic bearing, said second friction member being engaged with said guide means and movable vertically therealong; and
   (e) spring means fixed relative to the other of said opposed lower and upper surfaces and resiliently holding said second friction member in frictional engagement with said first friction member under a selected load, said spring means comprising means for adjusting the load applied to said second friction member.

2. An earthquake-insulating bearing assembly according to claim 1, in which said guide means comprises an annular wall, said second friction member comprising an annular member of an inverted U-shaped cross-section defined by a pair of opposed inner and outer arms and a horizontal base interconnecting said two arms at their one ends, said second friction member being fixedly secured to an upper surface of said base, said inner arm disposed in sliding contact with the inner peripheral surface of said annular guide wall to permit said annular member to vertically move along said guide wall.

3. An earthquake-insulating bearing assembly according to claim 2, in which said urging means comprises a plurality of vertical threaded rods fixedly mounted around the outer peripheral surface of said annular guide wall in circumferentially spaced relation, a plurality of nuts threaded on respective threaded rods, and a plurality of compression coil springs wound around respective threaded rods and acting between the lower surface of said base of said annular member and respective nuts, each of said nuts constituting said load adjusting means and being movable along said threaded rod to adjust the compressive force of said spring.

* * * * *